Figure 1:
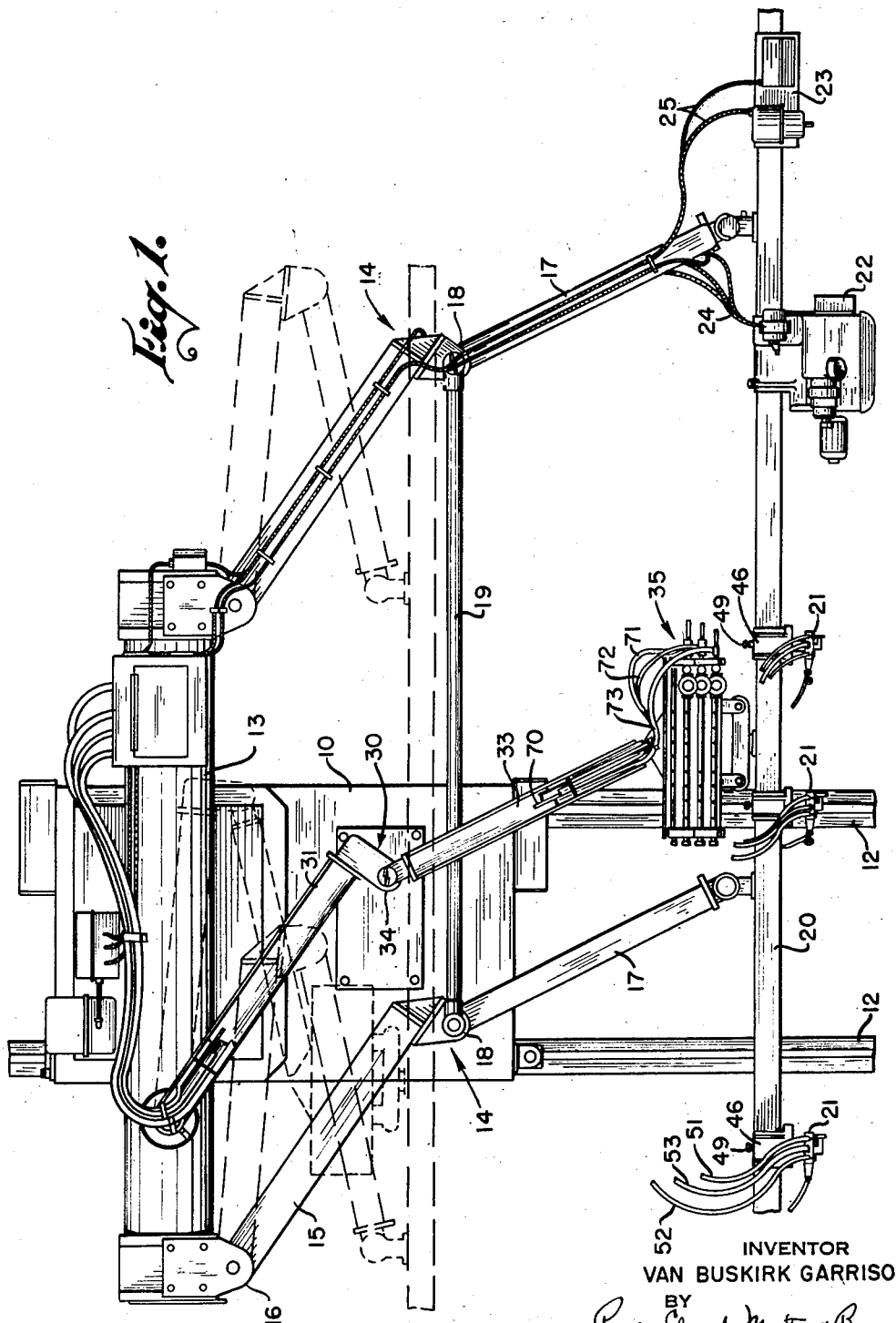

July 14, 1953 V. B. GARRISON 2,645,475
UNIVERSAL GAS CUTTING AND WELDING APPARATUS
Filed Jan. 9, 1951 4 Sheets-Sheet 1

INVENTOR
VAN BUSKIRK GARRISON
BY
ATTORNEYS

July 14, 1953 V. B. GARRISON 2,645,475
UNIVERSAL GAS CUTTING AND WELDING APPARATUS
Filed Jan. 9, 1951 4 Sheets-Sheet 2
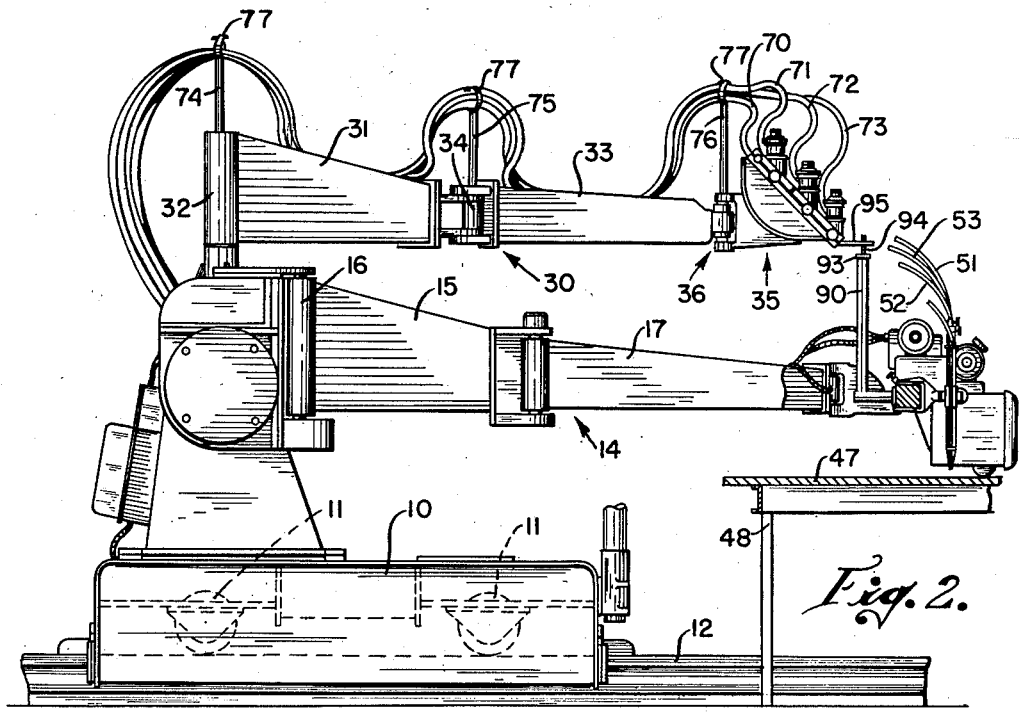
Fig. 2.
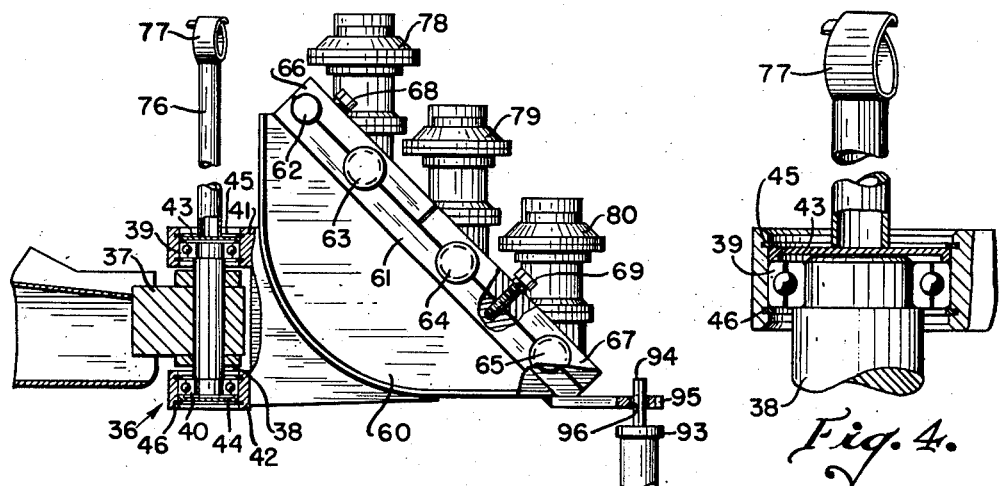
Fig. 3.
Fig. 4.
INVENTOR
VAN BUSKIRK GARRISON
BY
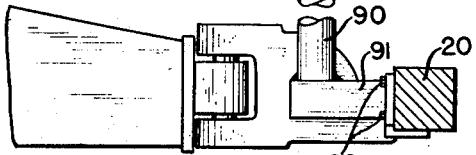
ATTORNEYS July 14, 1953 V. B. GARRISON 2,645,475
UNIVERSAL GAS CUTTING AND WELDING APPARATUS
Filed Jan. 9, 1951 4 Sheets-Sheet 3

INVENTOR
VAN BUSKIRK GARRISON
ATTORNEYS

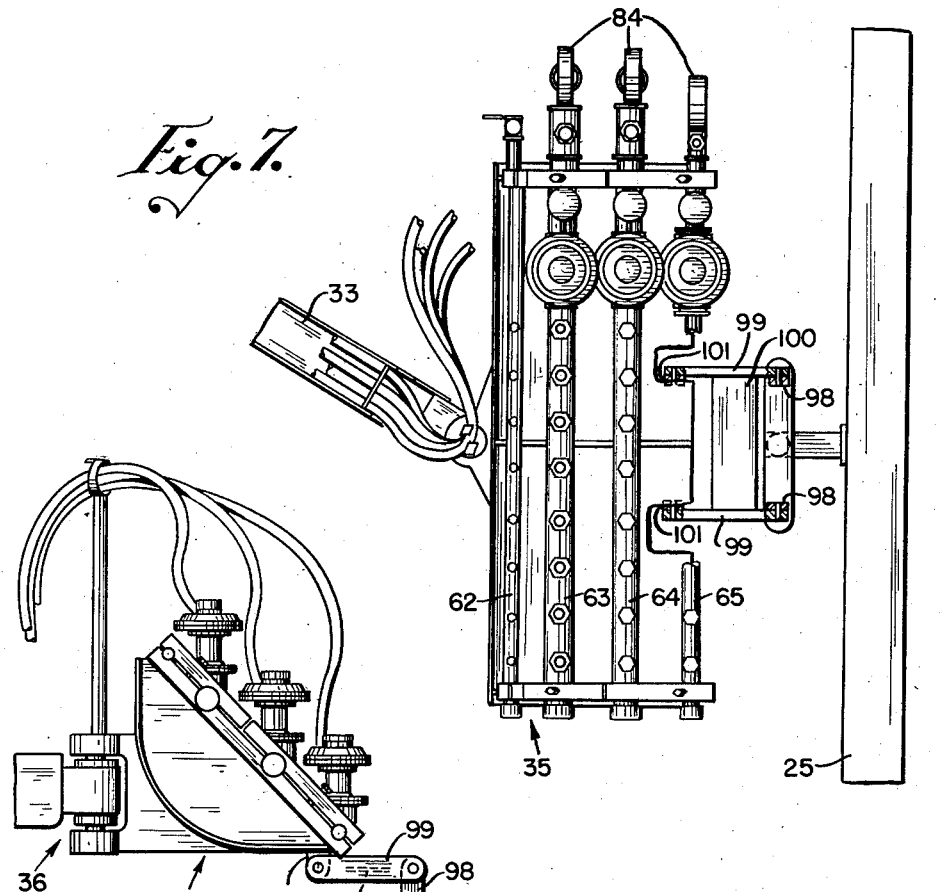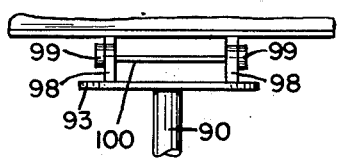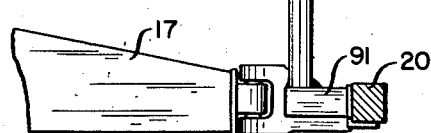
INVENTOR
VAN BUSKIRK GARRISON
BY
ATTORNEYS

Patented July 14, 1953

2,645,475

UNITED STATES PATENT OFFICE 2,645,475

UNIVERSAL GAS CUTTING AND WELDING APPARATUS

Van Buskirk Garrison, Caldwell, N. J., assignor to Air Reduction Company, Incorporated, Murray Hill, N. J., a corporation of New York Application January 9, 1951, Serial No. 205,137

4 Claims. (Cl. 266—23)

This invention relates to universal gas cutting and welding machines wherein at least one torch is supported for substantially universal movement in a plane. More particularly the invention is concerned with the provision in such a machine of means for supporting the gas connecting means (including gas supply hoses and manifolding means) for connecting the torch to a source of gas, substantially independently of the universal structure employed for supporting the torch.

Heretofore, in universal gas cutting and welding machines the manifolding means for the torch or torches supported by the universal structure have been mounted directly on the universal structure and the gas supply hoses connecting the manifolding means have either also been supported on the universal structure or have been carried on overhead cranes above the universal structure and connected to the manifolding means. Neither arrangement has proved to be entirely satisfactory because where manifolding means and gas supply hoses are supported by the universal structure their weight has served to create discrepancies in and retardation of the movement of the universal structure and the stiffness of the hoses has additionally tended to impart an appreciable resistance to movement of the universal structure. The carrying of the gas supply hoses on overhead cranes was advanced as at least a partial solution of the above difficulties but even this arrangement proved not to be entirely satisfactory since the hanging hoses produced a drag on the universal structure and caused discrepancies in the contour or pattern defined by the movement of the universal structure.

The primary object of this invention is, therefore, to make provision in a universal gas cutting and welding machine for supporting the weight of the manifolding means and the gas supply hoses completely independently of the universal structure supporting the torch and to eliminate substantially the drag heretofore imposed upon such a structure by the gas supply hoses.

Accordingly, the invention broadly contemplates the provision in a universal gas cutting and welding machine, having a torch bar for supporting a torch and a universal structure for supporting the torch bar for substantially universal movement in a plane, of a movable supporting structure completely independent of the torch bar and the universal torch bar supporting structure, for carrying at least that portion of the gas connecting means, connecting the torch to a source, which is adjacent the torch bar. This movable supporting structure for the gas connecting means is adapted to move the portion of the gas connecting means adjacent the torch bar in a path substantially identical to that of the torch bar. Means capable of transmitting horizontal forces only is also provided to interconnect the torch bar supporting structure and the gas connecting means supporting structure so that when the former is moved the latter is moved correspondingly. Thus, substantially the entire weight of the gas connecting means is supported other than by the torch bar or its universal supporting structure and the drag, formerly imposed upon the torch bar and its universal supporting structure, is substantially eliminated. The latter is accomplished because the portion of the gas connecting means adjacent the torch bar is always maintained by its movable supporting structure, and the interconnecting means, in the same special relationship with respect to the torch bar.

For instance, in a universal machine of the folding parallelogram type wherein a torch-supporting torch bar is supported for universal movement in a plane by a pair of jointed arms, an auxiliary jointed arm is provided for supporting a gas manifolding means and gas supply hoses leading from a source to the manifolding means. This auxiliary arm is completely independent of the folding parallelogram structure and is adapted to support, by a pivot connection, the manifolding means at its distal end adjacent the torch bar and to permit movement of the manifolding means in a path identical to the path of movement of the torch bar. The manifolding means and the torch bar are interconnected in such a way that when the torch bar is moved, in its plane of movement, moving forces are conveyed to the manifolding means whereby it moves in an identical path. The interconnecting means is, however, incapable of conveying or transmitting any vertical loading forces or vertical components thereof from the manifolding means to the torch bar. Thus the weight of the manifolding means and the main gas supply hoses is supported entirely independently of the torch bar or the folding parallelogram structure. Relatively light hoses are employed for connecting a torch supported by the torch bar to the manifolding means. No drag is imposed by these light hoses upon the torch bar, however, because they are always maintained in the same relative position with respect to the torch and the torch bar by reason of the fact that the interconnecting means between the torch bar and the manifolding means assures that the same spacial relationship of the manifolding means and the torch bar is always maintained. Thus the interconnecting means may comprise one member on the torch bar and another member on the manifolding means which have two spaced points of contact with each other whereby movement of the torch bar results in similar non-relative movement of the manifolding means.

Figure 5:
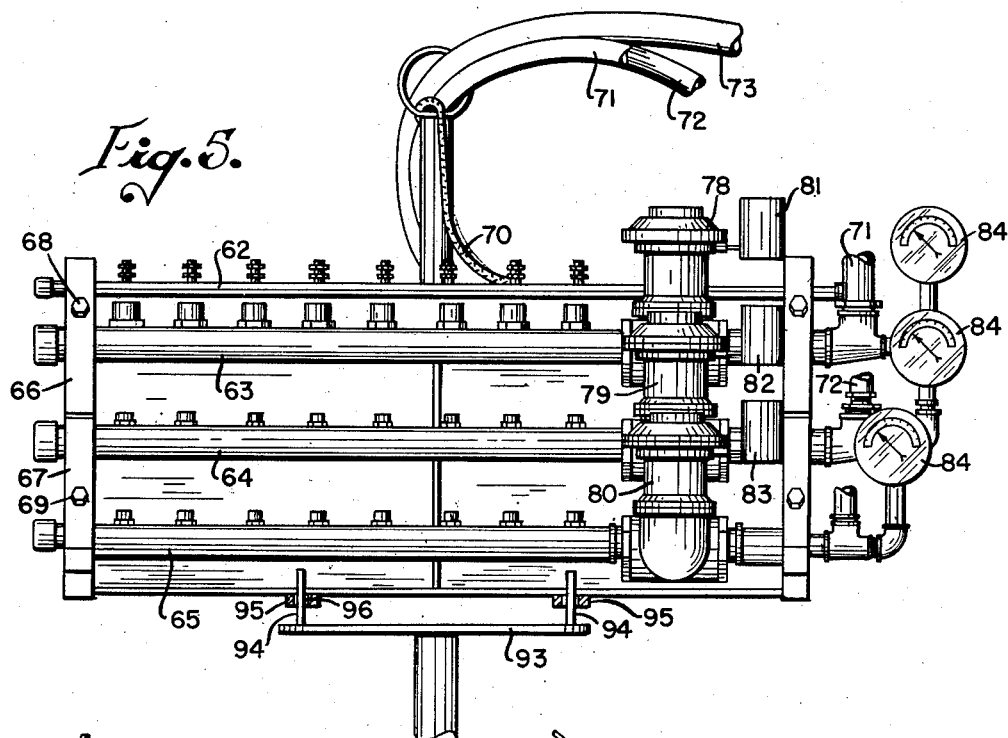
Figure 6:
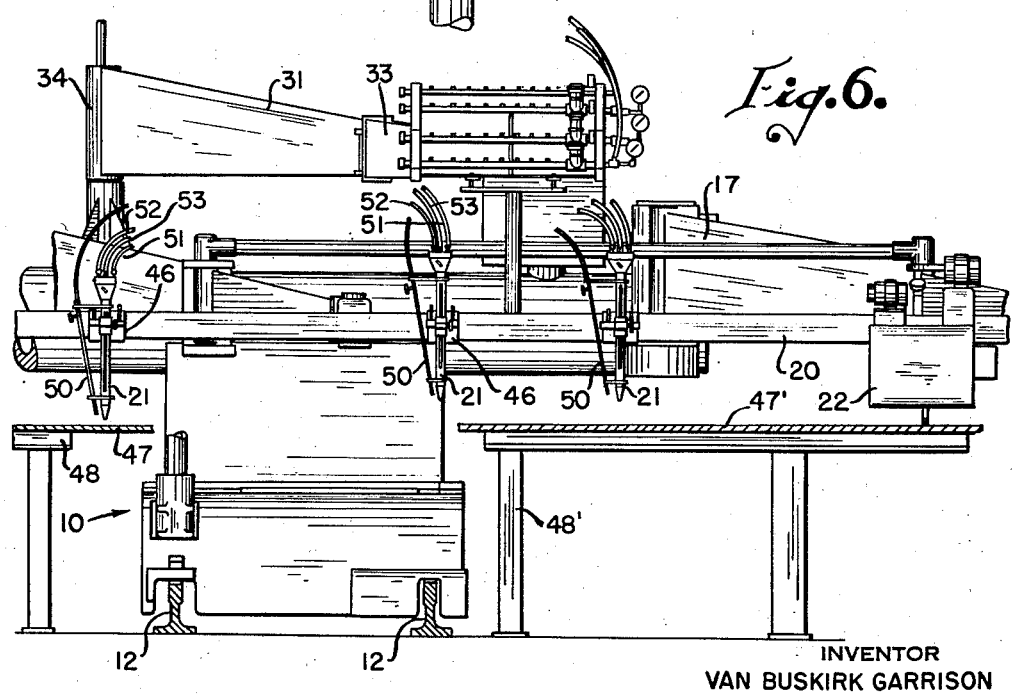

For a better understanding of the invention reference may be had to the accompanying drawings in which is illustrated one form of the invention embodied in a universal gas cutting and welding machine of the well-known folding parallelogram type, and in which, Fig. 1 is a plan view thereof, Fig. 2 is a side elevation thereof, Fig. 3 is an enlarged side elevation, partly in section, of the manifolding means and a means interconnecting the torch bar with it, Fig. 4 is an enlarged sectional view of a portion of one of the connections of the auxiliary jointed arm, Fig. 5 is a front elevation of the manifolding means showing a portion of the interconnecting means, Fig. 6 is a front elevation of a substantially greater part of the entire machine, Fig. 7 is a plan view, partly in section, illustrating a modified form of interconnecting means, Fig. 8 is a side elevation of the modified interconnecting means, and Fig. 9 is a fragmentary view of a part thereof.

Referring particularly to Figs. 1, 2 and 6, a conventional folding parallelogram type universal gas cutting and welding machine, in connection with which a specific embodiment of the invention will be described, comprises a carriage 10 supported by wheels 11 for movement on a pair of tracks 12. The folding parallelogram structure is mounted on carriage 10 and comprises a rear member 13 rigidly secured to the carriage and a pair of jointed arms, indicated generally at 14, supported at opposite ends of the rear member 13. Each jointed arm 14 is made up of a rear section 15, pivotally secured at 16 to rear member 13, and a forward section 17 pivotally secured at 18 to the distal end of rear section 15. The pivot connections 18 between rear sections 15 and forward sections 17 of the jointed arms 14 are connected by a connecting rod 19. Pivotally secured to the distal ends of forward sections 17 of the jointed arms 14, is a torch bar 20 adapted to support a plurality of cutting or welding torches 21 which are adjustable to various fixed positions upon the torch bar. An automatic tracer 22 is supported on the torch bar to control its movement as is also a control panel 23, the latter being adapted to control the movement of carriage 10 and being located on the torch bar for the convenience of the operator. Electrical cables 24 for the tracer and 25 for the control panel 23 are supported on one jointed arm 14 of the folding parallelogram structure.

The structure thus far described is conventional and is capable of supporting the torches 21 for universal movement in a horizontal plane. In Fig. 1 the folding parallelogram structure is shown in one substantially fully extended position in solid lines and in one substantially fully retracted position in dotted lines and for movement of it between two such positions the base carriage 10 need not be moved along tracks 12. However, when the movement of the torch bar 20 beyond limiting positions of the folding parallelogram structure itself is necessary, limit control switches on the arm structure are actuated to move the base carriage 10 along tracks 12, or the operator may effect such movement by operation of manual control switches in control panel 23.

Turning now to the apparatus which constitutes one form of the invention, it will be seen to comprise an auxiliary jointed arm indicated generally at 30 consisting of a rear section 31 secured by a pivot connection 32 to the fixed rear member 13 of the folding parallelogram structure and a forward section 33 pivotally secured by a pivot connection 34 to the distal end of rear section 31. A gas manifolding means indicated generally at 35 is supported on the distal end of forward section 33 of the auxiliary jointed arm 30, for pivotal movement in a horizontal plane with respect thereto, by a pivot connection 36.

The pivot connection 36 is shown in section in Fig. 3 and comprises a socket 37 fixedly supported on the distal end of forward section 33 of the auxiliary arm and a pivot pin 38 supported therein and having its opposite ends received by roller bearings 39 and 40 located within recesses or openings in rearwardly extending brackets 41 and 42 of the manifold. Roller bearings 39 and 40 are retained in brackets 41 and 42 by dust cover plates 43 and 44 and retaining rings 45 and 46. An enlarged sectional view of the mounting of bearing 39 is illustrated in Fig. 4. Pivot connection 34, between the rear section 31 and the forward section 33 of the auxiliary jointed arm 30, is of substantially the same construction as is pivot connection 36 by which the manifold 35 is supported.

Each of the torches 21, as best illustrated in Fig. 6, is mounted in a clamp structure 46 in which they may be disposed at various positions along the torch bar and in which the torches may be raised or lowered. As viewed in this figure, a torch 21 at the left of the base carriage is in lowered position illustrating the position of torches supported on the torch bar in operative spaced relation to the workpiece 47 supported on a table 48. Toward the right of the base structure two torches 21 are shown in inoperative position in which the torches are retracted upwardly. Clamps 46, as seen in Fig. 1, are provided with locking screws 49 by which they may be secured tightly at the desired longitudinal locations on the torch bar 20. The tracing device 22 is mounted on the right end of the torch bar and rides along a pattern surface 47' supported on a table 48'. The torches 21 are each provided with a pilot 50 as well as hose connections 51, 52 and 53 for acetylene, preheating oxygen and cutting oxygen. These hoses connect each torch with the respective manifolds of manifolding means 35. Separate valves for the pilot 50 and for the gas lines are provided on each of the torches 21 to enable the operator to shut off the flow of gas to torches mounted on the torch bar which are inoperative for a selected cutting operation.

There are any number of manifolding means which might be employed in the apparatus of the invention, but the particular form is not the important feature in this instance but rather the important thing is that it is supported independently of the torch bar and the jointed arms 14 of the folding parallelogram structure. The manifolding means here disclosed will be described particularly in connection with Figs. 3 and 5. It comprises a cradle indicated generally at 60 having end members 61 by which are supported a plurality of manifolds 62, 63, 64 and 65. Clamping members 66 and 67 are secured to end members 61 over the manifolds 62–65 by bolts 68 and 69 respectively and maintain the manifolds in place. Each of the manifolds is provided with a plurality of outlet nipples as seen in Fig. 5 by which it may be connected to the various torches 21 supported on the torch bar 20, manifold 62 being the gas manifold for the pilots 50 of the torches, manifold 63 the cutting oxygen manifold, manifold 64 the preheat oxygen manifold and manifold 65 the acetylene manifold.

The gases are supplied to the manifolds, as may be seen best in Fig. 2, by a plurality of hoses 70, 71, 72 and 73 which connect them to a source not shown. These main gas supply hoses are supported completely independently of the torch bar 20 and of the jointed arms 14 of the folding parallelogram structure by upstanding rods 74, 75 and 76 mounted on the pivot connections of the auxiliary folding arm 30. Each of the upstanding rods is provided with a loop 77 to retain the hoses thereon.

The gas for pilots 50 of the torches 21 is supplied directly by hose 70 to manifold 62 whereas the supply of gases for manifolds 63, 64 and 65 is controlled by diaphragm valves 78, 79 and 80 operatively connected respectively to the manifolds. Solenoid valves 81, 82 and 83 are supported adjacent diaphragm valves 78, 79 and 80, respectively and serve to control a supply of gas for loading the diaphragms of the respective diaphragm valves. Such a loading gas may be an additional gas such as nitrogen supplied separately to the manifolding means or, as is contemplated in the present case, may be cutting oxygen taken from the cutting oxygen supply by means not here illustrated. Additionally the supply line for each of the manifolds 63, 64 and 65 is provided with a pressure gage 84 as illustrated in Fig. 5.

It will be clear from the above description of the manifolding means and the various means for supplying gases thereto that no weight or drag is imposed by any of them upon the torch bar 20 or upon the jointed arms 14 of the folding parallelogram structure. Furthermore, the auxiliary jointed arm 30 is capable of moving the manifolding means universally in a path identical to the path of movement of the torch bar 20. Also, in the construction of the apparatus shown herein, which is the preferred form of the invention, the forward and rear sections respectively of the main arms 14 and the auxiliary arm 30 are equal in length and the pivot connections thereof are so disposed that the respective sections comprise the sides of a double parallelogram linkage configuration. Therefore, the movements of the forward and rear sections of the auxiliary arm 30 are substantially identical to the movements of the forward and rear sections of the main supporting arms respectively.

By reference to Figs. 2, 3, 5 and 6 particularly, one form of interconnecting means for connecting the torch bar 20 to the manifolding means 35, so that when the torch bar is moved the manifolding means will be moved correspondingly, will be described.

This interconnecting means comprises a vertical rod 90 supported by a bracket 91 secured to the torch bar 20 by bolts 92 as seen in Fig. 3. At its upper end rod 90 supports a horizontal plate 93 to the opposite ends of which are secured upright pins 94. A pair of brackets 95 are secured to the cradle 60 of the manifolding means 35 and extend forwardly thereof. Each bracket 95 is provided with a hole 96 somewhat larger in diameter than the diameter of pins 94. These holes 96 are adapted to receive freely pins 94. Because of the size of holes 96 no vertical forces or vertical components of force may be transmitted from the manifolding means 35 to the portion of the interconnecting means secured to the torch bar 20. However, when the torch bar is moved horizontally the interconnecting means transmits this movement to the manifolding means 35 thereby causing it to be moved correspondingly. By reason of the provision of two pins 94 and brackets 95 the spacial relationship of the manifolding means with respect to the torch bar is always maintained the same. Thus the manifolds 62—65 of the manifolding means are always maintained parallel to the torch bar 20. Therefore the hoses connecting the manifolding means to the various torches 21 are never moved relative to either the torch bar or the manifolding means and cannot become taut thereby imposing a drag upon the torch bar.

Referring now to Figs. 7–9, a modified type of interconnecting means is illustrated. This interconnecting means, as before, comprises an upstanding rod 90 secured to the torch bar 20 by bracket 91 as well as a plate 93 secured to the upper end of rod 90. Plate 93 supports at its opposite ends brackets 98 to which are pivotally secured links 99 for movement in vertical planes. Links 99 are connected by a plate 100 and each is connected by a pivot connection, at its other end, to one of a pair of brackets 101 depending from the manifolding means 35. The pivot connections between brackets 101 and links 99 additionally permit only pivotal movement of the links in vertical planes. Thus horizontal movement of the torch bar 20 is transmitted to the manifolding means 35 but no vertical forces or vertical components of force may be transmitted from the manifolding means 35 to the torch bar 20.

In operation of the universal gas cutting and welding machine which has been provided with the apparatus of my invention, when the torch bar 20 and therefore the torches 21 are moved in response to operation of the tracer 22 so also is the manifolding means 35 through either form of interconnecting means. However, no drag is imposed upon the torch bar by the gas supply hoses for the torches because of the constant spacial relationship of the manifolding means and the torch bar, nor is any weight imparted to the torch bar, with the exception of course of the relatively insignificant weight of portions of the hoses connecting the various torches to the manifolding means. Thus the movement of the torch bar is not retarded nor are discrepancies caused in the contour or pattern defined by movement of the torch bar as a result of the weight of the gas controlling and supplying means or as a result of drag.

I claim:

1. A universal gas cutting and welding machine comprising a torch bar for supporting a torch, means supporting the torch bar for substantially universal movement in a plane, gas manifolding means adjacent the torch bar, a first group of hoses supported independently of the torch and the torch bar for supplying gas from a source to the manifolding means, a second group of hoses for delivering gas from the manifolding means to the torch, a movable supporting structure for supporting said manifolding means independently of said torch bar and said torch bar supporting means, said movable supporting structure additionally supporting said manifolding means for universal movement substantially identical to the universal movement of the torch bar, said manifolding means being pivotally supported by said movable supporting structure, and means interconnecting said torch bar and said manifolding means to convey solely horizontal forces from said torch bar to said manifolding means when said torch bar is moved, said interconnecting means comprising a member on the torch bar and a member on the manifolding means, said members having two spaced points of contact whereby movement of the torch bar results in similar non-relative movement of the manifolding means.

2. A universal gas cutting and welding machine comprising a torch bar for supporting a torch, means supporting the torch bar for substantially universal movement in a plane, gas manifolding means adjacent the torch bar, a first group of hoses supported independently of the torch and the torch bar for supplying gas from a source to the manifolding means, a second group of hoses for delivering gas from the manifolding means to the torch, a movable supporting structure for supporting said manifolding means independently of said torch bar and said torch bar supporting means, said movable supporting structure additionally supporting said manifolding means for universal movement substantially identical to the universal movement of the torch bar, said manifolding means being pivotally supported by said movable supporting structure, and a pair of connections between the torch bar and the manifolding means which convey only horizontal forces from the torch bar to the manifolding means when the torch bar is moved, whereby movement of the torch bar results in similar non-relative movement of the manifolding means.

3. A universal gas cutting and welding machine comprising a torch bar for supporting a torch, means supporting the torch bar for substantially universal movement in a plane, gas manifolding means adjacent the torch bar, a first group of hoses supported independently of the torch and the torch bar for supplying gas from a source to the manifolding means, a second group of hoses for delivering gas from the manifolding means to the torch, a movable supporting structure for supporting said manifolding means independently of said torch bar and said torch bar supporting means, said movable supporting structure additionally supporting said manifolding means for universal movement substantially identical to the universal movement of the torch bar, said manifolding means being pivotally supported by said movable supporting structure, a pair of brackets fixed to one of said torch bar and said manifolding means and a pair of pins fixed to the other thereof, each of the brackets having a hole to receive a pin, said hole being substantially larger than the pin.

4. A universal gas cutting and welding machine comprising a torch bar for supporting a torch, means supporting the torch bar for substantially universal movement in a plane, gas manifolding means adjacent the torch bar, a first group of hoses supported independently of the torch and the torch bar for supplying gas from a source to the manifolding means, a second group of hoses for delivering gas from the manifolding means to the torch, a movable supporting structure for supporting said manifolding means independently of said torch bar and said torch bar supporting means, said movable supporting structure additionally supporting said manifolding means for universal movement substantially identical to the universal movement of the torch bar, said manifolding means being pivotally supported by said movable supporting structure, and a pair of connections between the torch bar and the manifolding means each of which comprises a member secured to the torch bar and a second member secured to the manifolding means, said members being pivotally secured to one another and relatively movable only in a vertical plane.

VAN BUSKIRK GARRISON.

References Cited in the file of this patent

UNITED STATES PATENTS

| Number | Name | Date |
| --- | --- | --- |
| 1,869,848 | Helmkamp | Aug. 2, 1932 |
| 2,000,007 | Anderson | May 7, 1935 |

FOREIGN PATENTS

| Number | Country | Date |
| --- | --- | --- |
| 155,925 | Austria | Apr. 11, 1939 |
| 417,236 | Germany | Aug. 8, 1925 |